United States Patent [19]
Holland et al.

[11] Patent Number: 5,651,399
[45] Date of Patent: Jul. 29, 1997

[54] APPARATUS FOR FABRICATING PASTED ELECTRODES

[75] Inventors: Arthur Holland, Bloomfield Hills; Douglas Lilburn, Newport; Donn Fillmore, Waterford; Edward Wood, Rochester, all of Mich.

[73] Assignee: Ovonic Battery Company, Inc., Troy, Mich.

[21] Appl. No.: 543,717

[22] Filed: Oct. 16, 1995

[51] Int. Cl.$^6$ .................................................. H01M 4/00
[52] U.S. Cl. .................................. 141/32; 141/1.1; 141/34
[58] Field of Search ............................ 141/1.1, 32–34; 29/623.5

[56] References Cited

U.S. PATENT DOCUMENTS

| | | | |
|---|---|---|---|
| 2,212,070 | 8/1940 | Luhrman | 141/32 |
| 2,215,438 | 9/1940 | Radle | 141/32 |
| 2,955,146 | 10/1960 | Vogt | 29/623.5 |
| 4,050,482 | 9/1977 | Ching et al. | 141/1.1 |
| 4,932,443 | 6/1990 | Karolek et al. | 141/1.1 |
| 5,385,587 | 1/1995 | Lund et al. | 29/623.5 |
| 5,467,805 | 11/1995 | Farina | 141/32 |

*Primary Examiner*—J. Casimer Jacyna
*Attorney, Agent, or Firm*—Marc J. Luddy; Marvin S. Siskind; David W. Schumaker

[57] ABSTRACT

A slurry loading apparatus for automatically loading a slurry into a substrate, the substrate having a front surface, a back surface opposite said front surface and an interior with voids between the front and back surfaces, the apparatus including a device for introducing the slurry onto the front surface and into the voids where excess slurry passes through the substrate and exits the back surface, and a device for repeatedly forcing the excess slurry back onto the back surface and into the voids.

23 Claims, 3 Drawing Sheets

APPARATUS FOR FABRICATING PASTED ELECTRODES

FIELD OF THE INVENTION

The present invention relates generally to the fabrication of pasted electrodes for an alkaline battery. More specifically, it relates to an automated apparatus and improved method for rapidly and uniformly pasting a solid particulate slurry into a continuous web of a porous substrate material.

BACKGROUND OF THE INVENTION

There are two basic types of rechargeable alkaline cells. These are nickel cadmium (NiCd) cells and nickel metal hydride (Ni-MH) cells. Both types of cells utilize positive and negative electrodes and the positive electrodes of both types of cells are composed of a nickel hydroxide material. At present, both sintered and pasted positive electrodes are used in NiCd and Ni-MH cells.

Sintered positive electrodes are constructed by applying a slurry, comprising nickel powder, to a substrate. This is followed by high temperature sintering whereby the individual nickel particles weld at their points of contact, resulting in a porous material. The sintered material is then impregnated with active material. Sintered electrodes have the advantage of being able to withstand shock and vibration because the active material sticks very well to the substrate. However, sintered electrodes have the disadvantage of having a comparatively low energy density. In order to increase energy density the current trend has been away from sintered electrodes toward the pasted ones.

Pasted electrodes using a nickel foam substrate exhibit satisfactory energy density as well as ruggedness. Such pasted positive electrodes are useful in both NiCd and Ni-MH rechargeable cells. The nickel foam substrate is manufactured by nickel plating polyurethane foam and then burning off the polyurethane. The resulting nickel foam is then loaded via a slurry with nickel hydroxide, the active ingredient of the positive electrode.

Manual and automated methods of pasting foam are known in the art. Manual methods tend to be slow and tedious. The process begins by combining and mixing the ingredients, adjusting the viscosity of the slurry for maximum loading, pouring the slurry over the foam substrate, and then spreading it over the surface of the foam with a spatula.

Certain properties of the foam affect loading. Variations in such factors as foam pore size, porosity, and depth affect how well the slurry can penetrate through the foam after it is poured onto one side of it. Such factors also determine the viscosity of the slurry that must be used in the loading process, as well as the amount of effort needed to force the slurry into the foam to achieve maximum loading. Very slow seepage may even require that the slurry be applied and pushed in from both sides of the foam, greatly increasing the time and effort needed to complete the loading process.

Besides the inherent slowness of the manual loading process, it has other disadvantages. The time needed to complete the process gives the slurry suspension time to settle. Hence, the viscosity of the slurry may change during the course of the loading process, resulting in electrodes exhibiting nonuniform densities of active material.

Hand loading, like all "by hand" operations is dependent on the individual performing the operation. If time and cost are not a factor, a skilled craftsman can produce positive electrode material of the highest quality.

Automatic loading can speed the process of applying slurry to foam. Several types of automated loading methods are used in practice. The most common are those which rely on mechanically rubbing or forcefully spraying the slurry into the foam.

Spraying methods automatically load the foam by spraying it from either one or both sides. One such method/apparatus is described in U.S. Pat. No. 4,582,098 (to Matsumoto et al, issued Apr. 15, 1986). The major problem with spraying (and especially those processes that rely on nothing more than spraying the slurry onto the foam from a single side) is that it results in a nonuniform application of the active nickel hydroxide ingredient into the foam substrate.

If a slurry, supplied at a certain flow rate, is simply sprayed from a single nozzle onto one of the surfaces of a porous foam substrate material, the liquid and solid components making up the slurry suspension separate because the liquid portion of the slurry penetrates more easily through the pores of the foam. This results in a nonuniform distribution of the nickel hydroxide active material. Slurry containing a higher concentration of solid will deposit near the surface that is closer to the nozzle, while slurry with a lower concentration of solid will penetrate deeper into the interior of the substrate material. Hence, spraying slurry with a single nozzle from just one side is unsatisfactory from the standpoint of a uniform concentration of active material through the entire volume of the foam.

There are other problems associated with automated loading that rely solely upon a spraying process. The filling density of the foam is sensitive to factors directly related to the spraying system used. For example, the filling density is affected by such factors as the amount of air that enters the slurry, the flow rate of the slurry at the nozzle port, and the distance between the foam and the spray nozzle spout.

Spraying the slurry onto both sides of the substrate, as disclosed in U.S. Pat. No. 4,582,098, fails to overcome all of these problems. Variations in filling density introduced into the process by the spray mechanisms are still present in such a two nozzle system. Furthermore, even when spraying from opposite sides some of the slurry that is sprayed at the surface rebounds and never penetrates the porous interior.

Thus, a loading system is needed that will combine the speed and noninvasiveness of an automated spray method with the superiority of loading seen in "by hand" application.

SUMMARY OF THE INVENTION

One object of the present invention is an automated pasting apparatus that achieves high, uniform loading at a rapid rate.

This and other objects are achieved by a slurry loading apparatus for automatically loading a slurry into a substrate, the substrate having a front surface, a back surface opposite the front surface and an interior with voids between the front and back surfaces. The apparatus comprises means for introducing the slurry onto the front surface and into the voids, with excess slurry passing through the substrate and exiting the back surface; and means for repeatedly forcing the excess slurry onto the back surface of the substrate and into the voids.

Other objects are obtained by the apparatus described above that further comprises a forcing cylinder and an outer cylinder exterior to and concentric with the forcing cylinder about a slurry axis, where the means for introducing the slurry is positioned on the outer cylinder and the forcing cylinder functions as the means for forcing excess slurry onto the back surface and into the voids.

Other objects are obtained by the apparatus described above where the means for introducing the slurry is a slurry inlet nozzle, and the means for forcing the excess slurry is a paddle wheel fan comprising a plurality of blades configured to push the excess slurry onto the back surface and into the voids.

Other objects are achieved by a method for loading a slurry into a substrate, the substrate having a front surface, a back surface opposite to the front surface, and voids between the two. The method comprising the steps of: (a) introducing the slurry onto the front surface and into the voids such that excess slurry passes through the substrate; (b) forcing excess slurry onto the back surface and into the voids; (c) wiping excess slurry from the front and the back surface; (d) recirculating the excess slurry by reintroducing the excess slurry onto the front surface.

Still other objects are attained by a nickel hydroxide slurry comprising nickel hydroxide, cobalt, cobalt monoxide, water, ethyl alcohol and polyvinyl alcohol.

DETAILED DESCRIPTION OF THE INVENTION

The present invention is an apparatus for automatically loading a slurry into a substrate material. This apparatus can be adapated for use with any substrate material and is specifically intended for use with substrate having a front surface, a back surface and an interior containing voids capable of retaining the slurry. Such substrate material most commonly used is nickel foam.

The present invention includes a means for introducing the slurry at the front surface of the substrate. The means for introducing the slurry is generally intended to be some type of nozzle. In operation, this nozzle is connected to a slurry reservoir and a pump. The slurry reservoir contains means for mixing and monitoring the slurry composition to assure that the slurry is maintained at the desired composition and consistancy. In general, slurry composition is varied to accomodate variations in the substrate so that loading is uniform. The pump delivers slurry from the reservoir at sufficient pressure through the nozzle to force the slurry onto the front surface of the substrate, and into the voids, and out the back surface of the substrate.

Variations in the pore size and porosity of the substrate as well as variations in the viscosity of the slurry are factors which affect the ability of the slurry to adequately penetrate the substrate. Changing the flow rate and pressure of the slurry can compensate for such variations and thus help to ensure that the slurry will sufficiently wet and penetrate the entire width of the substrate. The nozzle for introducing the slurry at the front surface of the substrate is preferably configured to include means for varying the flow rate and pressure of the slurry. This may be an adjustable orifice that permits varying both the flow pressure and flow rate of the slurry delivered through the use of adjustable plates, a needle valve, a gate valve, or any other adjustment means known in the art.

Figure 1:
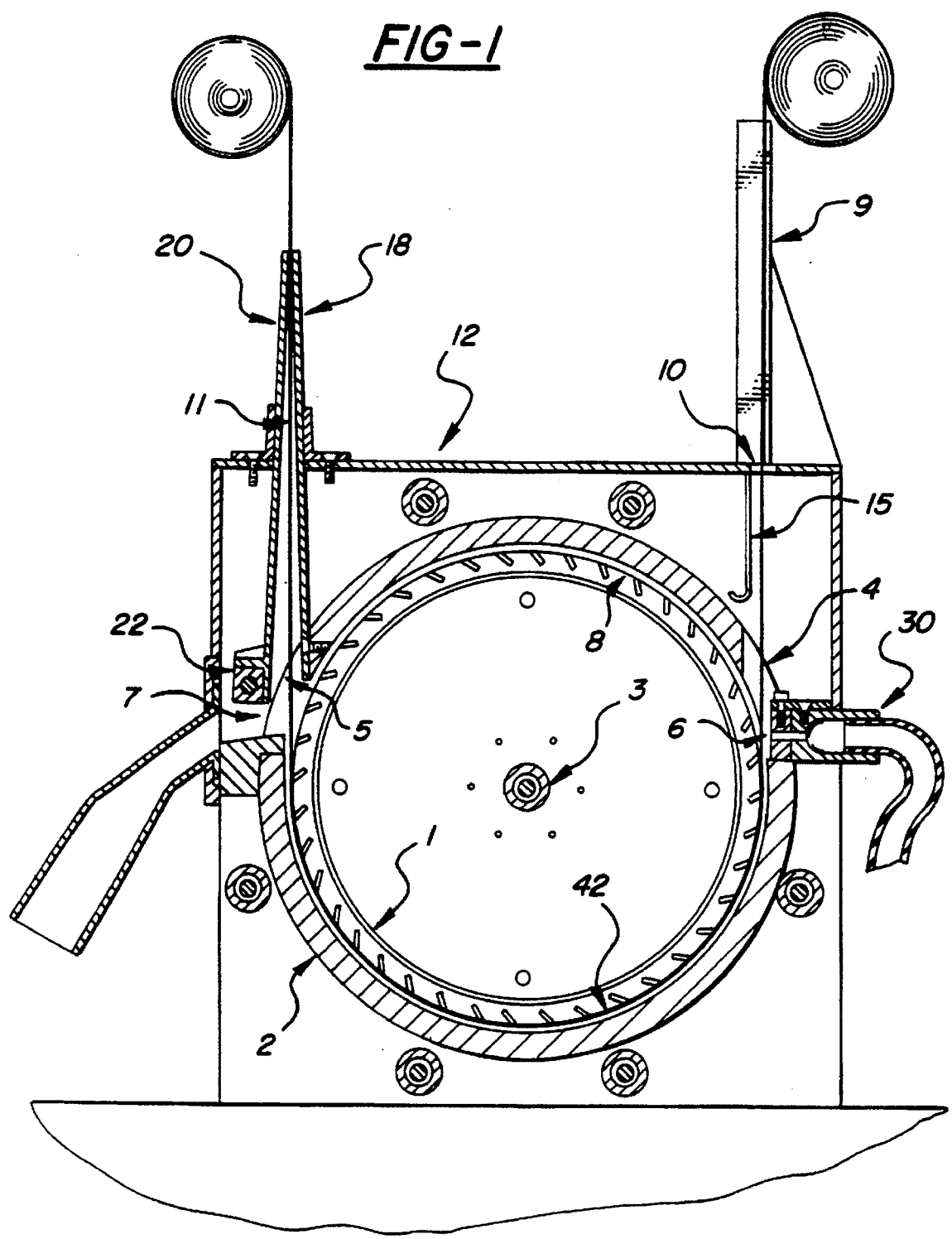
FIG. 1 is a side view of an embodiment of the automatic loading apparatus.
Figure 2:
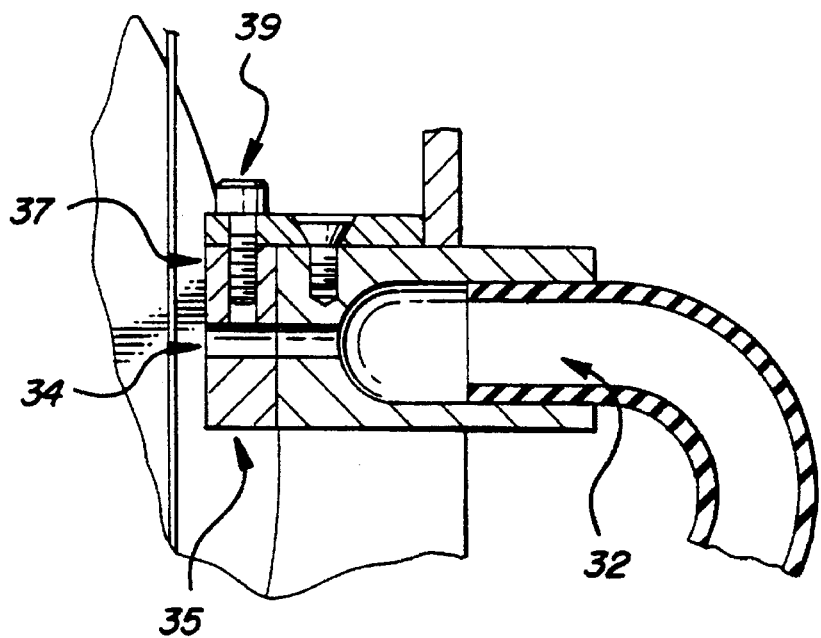
FIG. 2 is a side view of the slurry inlet nozzle showing the adjustable orifice.

FIGS. 1 and 2 show the slurry inlet nozzle 30 as the means for introducing the slurry. The slurry inlet nozzle can be adjusted to change the flow rate and flow pressure of the slurry applied to the substrate. The slurry inlet nozzle 30 is shown in more detail in FIG. 2. The slurry inlet nozzle includes an entrance orifice 32 which is an opening of fixed dimension. It also includes an adjustable exit orifice 34 which is a slit of fixed width and adjustable height. The width of the slit is at least as wide as the width of the substrate. The height of the exit orifice 34 can be adjusted to change the flow rate and flow pressure of the slurry that exits the nozzle. The adjustable exit orifice comprises a fixed plate 35, an adjustable plate 37 which is parallel to the fixed plate, and at least two adjusting screws 39 that are threaded through the adjustable plate 37. The adjusting screws are threaded through the adjustable plate so that rotation of the adjusting screws 39 moves the adjustable plate 37 closer to or further away from the fixed plate 35, thereby narrowing or widening the height of the exit orifice. Adjusting the height of the exit orifice 34 changes the area of the exit opening. This changes the flow rate and flow pressure of the slurry that exits from the nozzle.

The slurry inlet nozzle 30 is positioned on the outer cylinder 2 as shown in FIG. 1. FIG. 1 can be specifically described as including a slurry chamber 8, the region of the slurry loading apparatus where the slurry is actually applied to unloaded substrate. The slurry chamber is defined by an inner cylinder 1 and an outer cylinder 2. Both the inner and outer cylinders are concentric about the slurry axis 3. The distance between the inner and outer cylinders can be any distance appropriate for adequate loading. Generally, this distance depends upon the type and thickness of the substrate being used. A nickel foam substrate of thickness of about 0.06 inches is used in the embodiment of the present invention shown in FIG. 1.

The outer cylinder 2 includes a substrate entry port 4 through which substrate enters the slurry chamber as well as a substrate exit port 5 through which loaded substrate exits the slurry chamber. The outer cylinder 2 also includes a slurry entry port 6 through which the slurry enters the slurry chamber and a slurry exit port 7 through which slurry is removed from the slurry chamber.

After the initial application of slurry from the slurry inlet nozzle 30 onto the front surface of the substrate, slurry penetrates the porous interior of the substrate and partially fills the voids. Excess slurry passes through and exits at the back surface of the substrate. Despite the fact that slurry passes through and exits the back side of the substrate, the voids within the porous interior of the substrate are only partially filled. As a result, maximum loading is not achieved.

The prior art, such as U.S. Pat. No. 4,582,098 (to Matsumoto et al. issued Apr. 15, 1986) attempts to maximize loading by using two nozzles positioned on opposite sides of the substrate. This technique suffers from problems dealing with variations in the filling density of the substrate that are introduced by the spray mechanisms. Moreover, the method also suffers from the fact that even when spraying from opposite sides, some slurry rebounds off the surface of the substrate and fails to penetrate the substrate interior. Hence, loading is still not maximized.

The present invention overcomes the problems with the prior art by providing means for repeatedly forcing excess slurry into the back surface of the substrate. Such repeated action ensures that the slurry penetrates and fills the voids so as to maximize loading.

Preferably, the means for forcing excess slurry is a forcing cylinder which is positioned between and concentric with the outer cylinder 2 and the inner cylinder 1. An embodiment of the forcing cylinder is the paddle wheel fan 42 shown in FIG. 3. The paddle wheel fan 42 has a plurality of blades 44 And two rims 46 and 47 that hold the blades firmly in place. The blades and rims are attached so as to form a cylindrical structure, with the rims forming the ends of the cylinder and the blades spaced equidistantly around the rims. In the present invention, the paddle wheel fan 42 is positioned between and concentric with the inner and outer cylinders 1 and 2. The distance between the paddle wheel fan 42 and outer cylinder 2 must be large enough to enable the substrate to move in between the two. However, this distance should also be small enough so that the movement of the substrate relative to the outer cylinder creates a turbulent motion in the slurry present within this region. This turbulence forces additional slurry through the front surface of the substrate. In an embodiment of the present invention, this distance is preferably between 0.05 to 0.5 inches, more preferably between 0.15 and 0.3 inches, and most preferably about 0.22 inches. The distance between the inner cylinder 1 and the paddle wheel fan 42 is chosen to minimize the amount of slurry used during the loading process.

Figure 3:
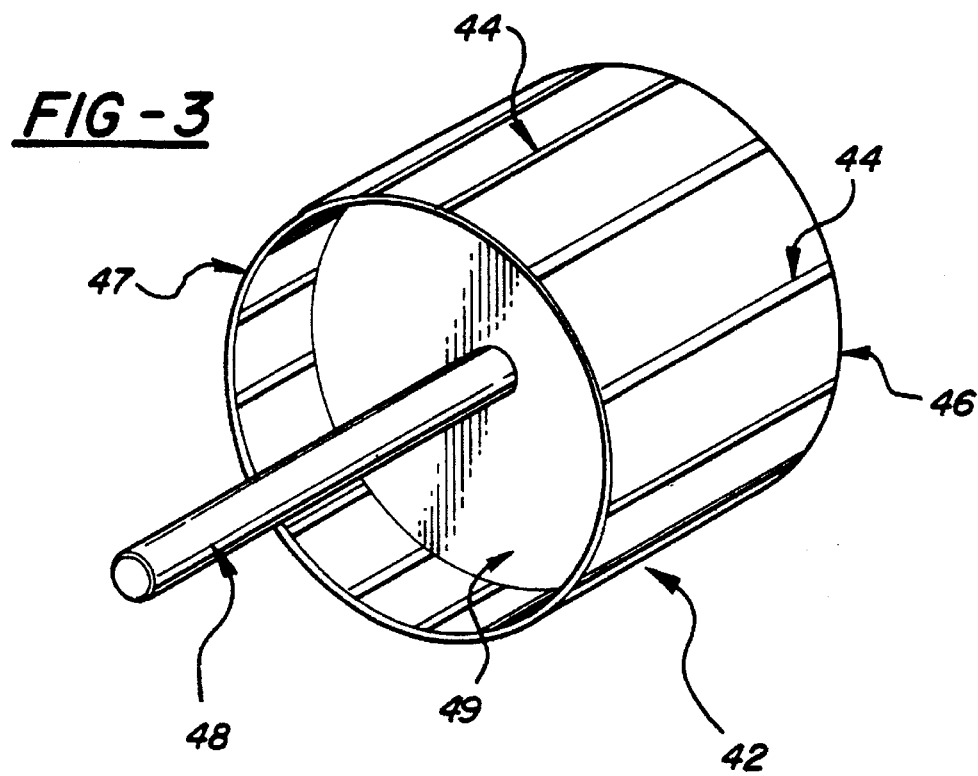
FIG. 3 is a three-dimensional view of a paddle wheel fan.

FIG. 3 shows the paddle wheel shaft 48. The paddle wheel shaft 48 is collinear with the slurry axis 3. The paddle wheel shaft 48 is mechanically coupled to the paddle wheel fan 42. In FIG. 3 this is via the paddle wheel backplate 49. Rotation of the paddle wheel shaft 48 rotates the paddle wheel fan 42.

The substrate that is guided into the slurry chamber 8 fits between the paddle wheel fan 42 and the outer cylinder 2. The substrate moves in the direction from the substrate entry port 4 to the substrate exit port 5 along the lower section of the slurry chamber that connects the two ports.

As mentioned above, the slurry is introduced onto the front surface of the substrate by the slurry inlet nozzle 30. While some of the slurry remains within the porous interior of the substrate, excess slurry passes through the substrate and exits at the back surface. The rotation of the paddle wheel fan 42 causes the blades 44 to push the excess slurry back into the substrate through the back surface. The direction of paddle wheel fan rotation, speed of rotation, as well as blade angle and shape are all important factors in optimizing the amount of slurry loaded.

In an embodiment of the present invention, the paddle wheel fan 42 rotates in the same direction as the movement of the substrate within the slurry chamber. The speed of the paddle wheel fan relative to that of the substrate is important not only in optimizing the loading of the substrate but also in ensuring that loading occurs without damage to the substrate. The paddle wheel fan must rotate fast enough so that the blades propel the slurry in the direction of the substrate with enough force to ensure that the slurry forms a viscous barrier between the substrate and the moving blades. Preferably, the paddle wheel fan rotates faster than the movement of the substrate. More preferably, the paddle wheel fan rotates up to four times faster than the movement of the substrate. Most preferably, the paddle wheel fan rotates approximately twice as fast as the movement of the substrate.

The blades are positioned around the paddle wheel fan to optimize loading and to push the slurry onto the back surface of the substrate as the paddle wheel fan rotates. In the embodiment of the present invention illustrated in the Figures, the blades are flat rather than curved and are positioned to form a backward inclined system whereby the tip of each blade (i.e. the edge remote from the slurry axis) is inclined away from the direction of rotation. Other embodiments of the paddle wheel fan and blades are also feasible. The blades may be curved. As well, the blades may be forward inclined or even radially positioned.

Figure 4:
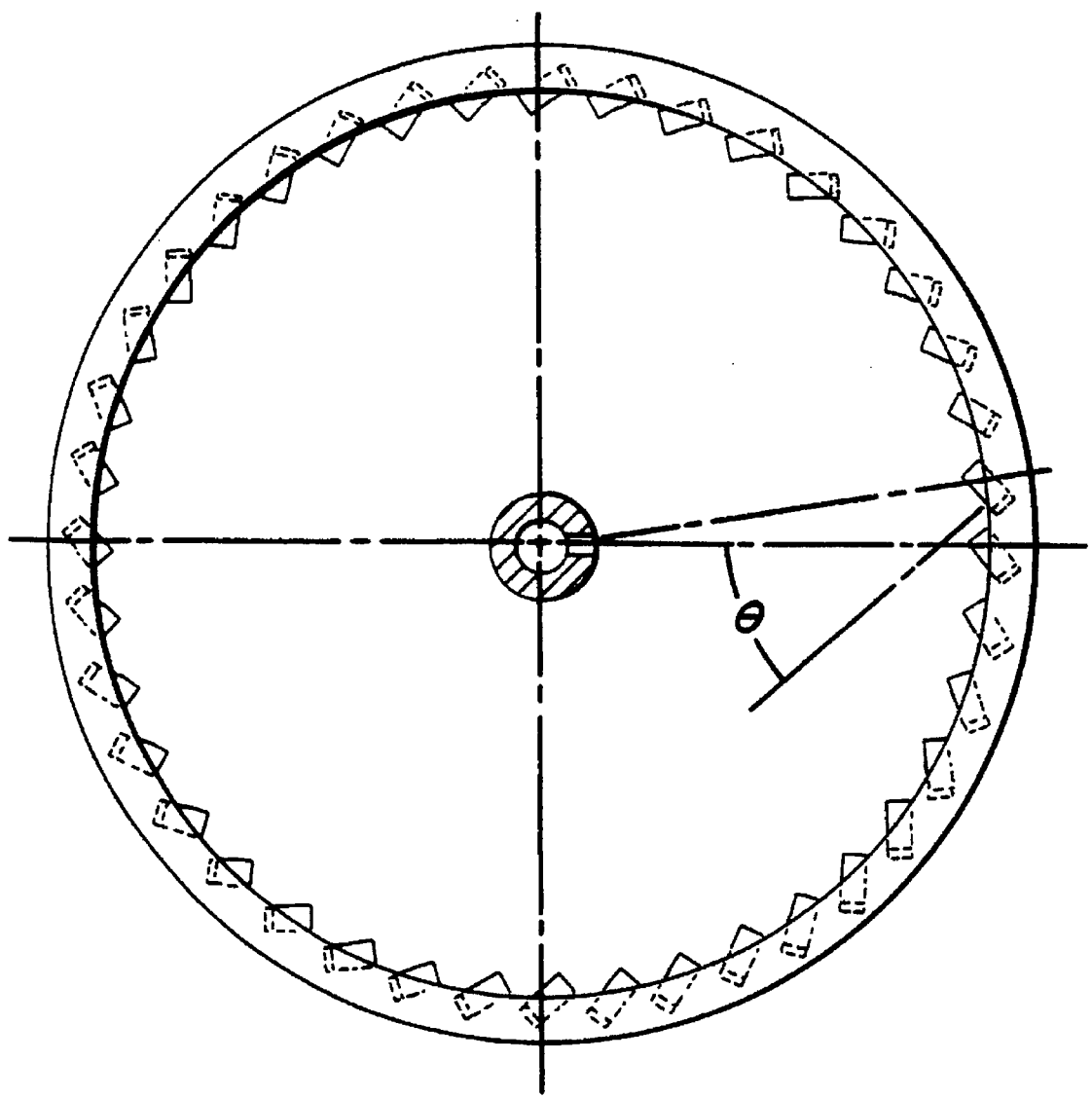
FIG. 4 is a side view of a paddle wheel fan showing blade angle.

FIG. 4 shows that the angle of inclination for each blade is measured as the angle $\theta$ between the blade and the radius drawn to the tip of that blade. Generally, the angle $\theta$ is between 0 and 90 degress. Preferably, the angle $\theta$ of the blades is between 20 and 60 degrees. More preferably, the angle $\theta$ of the blades is between 30 to 40 degrees. Most preferably, the angle $\theta$ of the blades is about 37 degrees.

In summary, excess slurry exiting at the back surface of the substrate is forced back through the substrate at the back surface in order to achieve greater loading. In the embodiment described, this is accomplished by the rotation of the paddle wheel fan 42, whereby the movement of the blades 44 pushes the slurry into the substrate as the substrate moves along the lower half of the slurry chamber between the paddle wheel fan and outer cylinder.

Other embodiments of means for forcing the slurry back into the substrate are also conceivable. Other possibilities include vibrational, accoustical, electrical, thermal or any other means known in the art to repeatedly push the slurry into the substrate. As well, the path of the substrate is not limited to the circular path outlined above. Other configurations may be more optimal depending upon the substrate and slurry used as well as the means for introducing slurry and means for forcing excess slurry chosen.

After slurry has been applied to both the front and back surfaces of the substrate, the surfaces are wiped and smoothed. The present invention provides means for wiping and smoothing both surfaces of the substrate as it exits the slurry chamber. This includes a first plate and a second plate positioned to pinch the substrate. It also includes an adjusting mechanism for varying the pressure the wiping plates exert on the substrate during the wiping and smoothing process.

FIG. 1 shows an embodiment of the present invention that incorporates two wiping plates, a fixed wiping plate 18 and an adjustable wiping plate 20. As the loaded substrate leaves the slurry chamber through the substrate exit port, it becomes sandwiched between the two plates. The plates are positioned to form a wedge that pinches the substrate so that contact is made on both the front and back surfaces. The pressure exerted by the plates on the front and back surfaces of the substrate wipes and smoothes the surfaces.

The present invention provides an adjusting mechanism for varying the pressure exerted by the wiping plates. One embodiment of the adjusting mechanism is an adjustment bar 22 which can be rotated about a fixed axis. The bottom of the adjustable wiping plate 20 is attached to the adjustment bar 22. As the adjustment bar 22 is rotated, the pressure in which the substrate is pinched by the wiping plates changes.

As the substrate moves within the slurry chamber (from the substrate entry port 4 to the substrate exit port 5), the paddle wheel fan repeatedly forces slurry onto the substrate's back surface. Only a portion of the slurry within the slurry chamber is actually loaded into the substrate. Slurry that is not loaded into the substrate remains in the chamber. This residual slurry follows the path of the substrate and paddle wheel fan. It moves toward and collects at the slurry exit port 7 of the outer cylinder. The present invention includes means for removing the excess slurry from the slurry exit port so that it can be recirculated and reintroduced via the slurry inlet nozzle. The recirculation of the unloaded slurry helps prevent wasted slurry, a expensive component of the final electrode.

An embodiment of the present invention also includes an outer enclosure which encloses the slurry chamber. Shown in FIG. 1, the outer enclosure 12 serves as a frame for attaching other parts of the apparatus. It also serves to prevent the escape of volatile components of the slurry. The outer enclosure 12 is designed so that one or more of its surfaces can easily be removed to allow access for maintenance and cleaning of the slurry loading apparatus.

Substrate enters the outer enclosure 12 through the substrate entry aperture 10. The substrate exits the outer enclosure 12 through the substrate exit aperture 11 after loading has taken place. On the exterior of the outer enclosure 12, adjacent to the substrate entry aperture 10, is the outer substrate guide 9. The outer substrate guide 9 gently guides the substrate through the substrate entry aperture 10, helping to prevent any damage to the substrate. An inner substrate guide 15 is attached to the interior of the outer enclosure, adjacent to the substrate entry aperture 10. Once inside the outer enclosure 12, the inner substrate guide 15 guides the substrate through the substrate entry port 4 and into slurry chamber.

Another aspect of the present invention is a method for loading a slurry into any substrate having a front surface, a back surface and voids between the two. While the present invention discusses nickel foam substrate particularly, it is likewise adaptable to any battery substrate material having void spaces defined between outer surfaces such as compacted nickel fibers, nickel coated graphite fibers, etc. The method of the invention comprises introducing the slurry onto the front surface and into the voids, such that excess slurry passes through the substrate; repeatedly forcing excess slurry onto the back surface and into the voids; wiping excess slurry from the front and the back surfaces of the substrate; and recirculating the excess slurry to avoid waste.

The nickel hydroxide slurry used in the loading process of the invention is a unique mixture of solid and liquid ingredients which form a suspension when combined. The composition of ingredients used to make the slurry in accordance with the present invention is nickel hydroxide, cobalt, cobalt monoxide, ethyl alcohol, water and polyvinyl alcohol (PVA). Preferably, the percentages by weight of the ingredients are nickel hydroxide in the range of 40% to 80%, cobalt in the range of 1% to 10%, cobalt monoxide in the range of 1% to 10%, water in the range of 10% to 30%, ethyl alcohol in the range of 1% to 20%, and polyvinyl alcohol in the range of 0.10% to 2%. More preferably, the percentages by weight of the ingredients are nickel hydroxide in the range of 50% to 70%, cobalt in the range of 2% to 5%, cobalt monoxide in the range of 2% to 6%, water in the range of 15% to 25%, ethyl alcohol in the range 5% to 15%, and polyvinyl alcohol in the range of 0.10% to 1%. Most prefereably, the percentages by weight of the ingredients is nickel hydroxide are about 62.4%, cobalt is about 3.4%, cobalt monoxide is about 4.3%, water is about 18.2%, ethyl alcohol is about 9.2%, and polyvinyl alcohol about 0.32%.

EXAMPLE

An embodiment of the slurry loading apparatus described in the present invention was built having the following specifications: Distance between outer cylinder and paddle wheel fan of about 0.22 inches, speed of paddle wheel fan about twice as fast as the speed of substrate, and blade angle of about 37 degrees.

The slurry loading apparatus with the above specifications was run using a nickel foam substrate with a thickness of about 0.06 inches, and a slurry with the following mix of ingredients (percentages are by weight of ingredient):

nickel hyroxide—about 62.4%,
cobalt—about 3.4%,
cobalt monoxide—about 4.3%,
water—about 18.2%,
ethyl—about 9.2%, and
polyvinyl alcohol—about 0.32%.
The loading results achieved were as follows:

|  | Loading Rate | Loading Density |
|---|---|---|
| Using Loading Apparatus | 5'/minute | 1.43 gm/sq inch |
| "By Hand" Application | 1'/minute | 1.39 gm/sq inch |

It is understood that the present invention can also be used in ways not specifically described above. For example, the described loading apparatus could also be used for fabricating pasted negative electrodes with alternative substrate materials. Further modifications and usages will be readily apparent to those skilled in the art without departing from the spirit and the scope of the present invention. Further, the above description is in no way intended to limit the scope of the following claims.

We claim:

1. A slurry loading apparatus for automatically loading a slurry into a substrate, said substrate having a front surface, a back surface opposite said front surface and an interior with voids between said front and back surfaces, said apparatus comprising:

means for introducing said slurry onto said front surface and into said voids where excess slurry passes through said substrate and exits said back surface;

means for repeatedly forcing said excess slurry back onto said back surface and into said voids; and a forcing cylinder and an outer cylinder exterior to and concentric with said forcing cylinder about a slurry axis, where said means for introducing said slurry is positioned on said outer cylinder and said forcing cylinder functions as said means for repeatedly forcing said excess slurry.

2. The slurry loading apparatus of claim 1 wherein said means for introducing said slurry is a slurry inlet nozzle;

said means for repeatedly forcing said excess slurry is a paddle wheel fan comprising:

a plurality of blades configured to push said excess slurry onto said back surface and into said voids.

3. The slurry loading apparatus of claim 2, wherein the distance between said paddle wheel fan said outer cylinder is greater than the thickness of said substrate.

4. The slurry loading apparatus of claim 3, wherein the distance between said paddle wheel fan and said outer cylinder is between 0.05 inches and 0.5 inches.

5. The slurry loading apparatus of claim 4, wherein the distance between said paddle wheel fan and said outer cylinder is between 0.15 inches and 0.3 inches.

6. The slurry loading apparatus of claim 5, wherein the distance between said paddle wheel fan and said outer cylinder is about 0.22 inches.

7. The slurry loading apparatus of claim 2, wherein said slurry inlet nozzle comprises an adjustable exit orifice.

8. The slurry loading apparatus of claim 7, wherein said adjustable exit orifice comprises:

a fixed plate; and an adjustable plate positioned parallel to said fixed plate, where said fixed plate can be moved relative to said fixed plate.

9. The slurry loading apparatus of claim 2 wherein said plurality of blades are equidistantly spaced around said paddle wheel fan.

10. The slurry loading apparatus of claim 2 wherein said plurality of blades are backward inclined.

11. The slurry loading apparatus of claim 2 wherein each of said plurality of blades is flat.

12. The slurry loading apparatus of claim 11 wherein the angle between each of said plurality of blades and the radius from said slurry axis to the respective tip of each of said plurality of blades is the blade angle; and said blade angle is between 20 and 60 degrees.

13. The slurry loading apparatus of claim 12 wherein said blade angle is between 30 and 40 degrees.

14. The slurry loading apparatus of claim 13 wherein said blade angle is about 37 degrees.

15. The slurry loading apparatus of claim 2, wherein said paddle wheel fan moves in the same direction as said substrate.

16. The slurry loading apparatus of claim 15, wherein said paddle wheel fan rotates faster than said substrate.

17. The slurry loading apparatus of claim 16 wherein said paddle wheel fan rotates up to four times faster than said substrate.

18. The slurry loading apparatus of claim 17, wherein said paddle wheel fan rotates about twice as fast as said substrate.

19. The slurry loading apparatus of claim 1 further comprising a wiping means for wiping and smoothing said front and back surfaces of said substrate after said substrate has moved between said forcing cylinder and said outer cylinder.

20. The slurry loading apparatus of claim 19, wherein said wiping means comprises:

a first plate and a second plate positioned to pinch said substrate between said first plate and said second plate.

21. The slurry loading apparatus of claim 20, wherein said first plate comprises a fixed wiping plate; and said second plate comprises an adjustable wiping plate that can be adjusted to change the pressure with which said substrate is pinched.

22. The slurry loading apparatus of claim 1, wherein said apparatus further comprises a means for recycling excess slurry for reuse.

23. The slurry loading apparatus of claim 1, wherein said apparatus further comprises an outer enclosure for preventing the escape of volatile components of said slurry.

* * * * *